US008401574B2

(12) United States Patent
Bedekar et al.

(10) Patent No.: US 8,401,574 B2
(45) Date of Patent: Mar. 19, 2013

(54) METHOD AND APPARATUS FOR MANAGING DELIVERY OF INFORMATION IN A WIRELESS COMMUNICATION NETWORK

(75) Inventors: Anand S. Bedekar, Arlington Heights, IL (US); Rajeev Agrawal, Northbrook, IL (US); Venkat Gopikanth, Buffalo Grove, IL (US); Suresh Kalyanasundaram, Bangalore Karnataka (IN); Ram O V Vishnu, Trivandrum Kerala (IN)

(73) Assignee: Motorola Mobility LLC, Libertyville, IL (US)

( * ) Notice: Subject to any disclaimer, the term of this patent is extended or adjusted under 35 U.S.C. 154(b) by 885 days.

(21) Appl. No.: 11/996,029

(22) PCT Filed: Jun. 30, 2006

(86) PCT No.: PCT/US2006/025663
§ 371 (c)(1),
(2), (4) Date: Jan. 17, 2008

(87) PCT Pub. No.: WO2007/027292
PCT Pub. Date: Mar. 8, 2007

(65) Prior Publication Data
US 2008/0207225 A1 Aug. 28, 2008

(30) Foreign Application Priority Data

Aug. 29, 2005 (IN) .............................. 783/KOL/2005

(51) Int. Cl.
*H04W 74/00* (2009.01)
(52) U.S. Cl. ..................... 455/458; 455/428; 455/456.2; 455/560; 455/561
(58) Field of Classification Search ............... 455/456.5, 455/428, 458, 560, 561
See application file for complete search history.

(56) References Cited

U.S. PATENT DOCUMENTS

2002/0187793 A1* 12/2002 Papadimitriou et al. ....... 455/458
2004/0102200 A1* 5/2004 Palkisto et al. ............... 455/466

OTHER PUBLICATIONS

Liebsch, Utilization of IEEE 802.11 Power Save Mode with IP Paging, 2005 IEEE International Conference on Communications, May 16-20, 2005, pp. 1383-1389.
Gyasi-Agyei, Mobile IP-DECT Internetworking Architecture Supporting IMT-2000 Application, IEEE Network, Nov./Dec. 2001, pp. 10-22.
Akyildiz et al. A Survey of Mobility Management in Next-Generation All-IP-Based Wireless Systems, IEEE Wireless Communications, Aug. 2004, pp. 16-28.

* cited by examiner

*Primary Examiner* — Kamran Afshar
*Assistant Examiner* — Sayed T Zewari

(57) ABSTRACT

A method and apparatus for managing delivery of information in a wireless network (100) includes bearer plane information handlers (110, 111), each of which maintains a database of paging controller associations (200). Each paging controller association is an association of an idle mobile device to a last known paging controller of that idle mobile device. The apparatus also includes paging controllers (115-118), each of which is associated with at least one paging area (130-133). For each paging area, the paging controller maintains a database of all base transmitters of the paging area that are associated with the paging controller (310) and maintains a database of other selected paging controllers that control base transmitters in the paging area (315). Using these resources, the method uses location notification messages and paging responses to deliver bearer plane information to a mobile device (125) that has been idle.

5 Claims, 4 Drawing Sheets

METHOD AND APPARATUS FOR MANAGING DELIVERY OF INFORMATION IN A WIRELESS COMMUNICATION NETWORK

FIELD OF THE INVENTION

The present invention relates generally to wireless communication networks, and more specifically to handling information delivery to idle mobile devices in wireless communication networks.

BACKGROUND

In many present day wireless communication networks, information such as voice, text, or video is routed to mobile devices such as cellular handsets by first being sent to a function within the wireless communication network that acts as a home agent for the wireless device in the wireless communication network. The information is routed to the home agent, which acts as a distribution point to get the information to the mobile device. To get the information to the mobile device, the information must be routed to a base transmitter that is best able to communicate by radio with the mobile device. Typically these networks comprise a hierarchy of functions, with a top-level anchor point such as the home agent in an Internet-Protocol-based network, or a Global mobile switching center (GMSC) in a GSM network, or a Gateway GPRS Support Node (GGSN) in a UMTS network, at a central point of the radio network. The top-level anchor point such as a home agent is typically coupled to a plurality of intermediate controllers that are in turn coupled to base transmitters. In a GSM network the intermediate controllers are mobile switching centers (MSCs) or base site controllers (BSCs), and in a UMTS network, the intermediate controllers could be Serving GPRS Support Nodes (SGSNs) or Radio Network Controllers (RNCs). When information is transmitted to a mobile device, it may be routed through the home agent, an intermediate controller, and a base transmitter to the mobile device. The information routing paths form what is called a bearer plane in the network, so named because the paths bear the end user information to the mobile devices.

In order to reduce the latency of delivery of new information to mobile devices, the mobile devices are typically tracked by the system even when they are in a state in which they not sending or receiving information such as voice, text, or video. This state is named the idle state in some systems. In order to perform the tracking, location databases must be kept. Presently, such databases are maintained and used by those functions that are providing the bearer plane. The bearer plane functions are normally dedicated to specific paging areas. Such an arrangement has a problem that the location database and maintenance functions have to be scaled the same as the bearer plane functions. Another problem is that the scaling of the bearer plane and location management functions in conventional systems is tightly coupled to the scales of the paging areas, so that if it is desired to increase the size of existing paging areas, it necessitates increasing the capacity of already deployed bearer plane and location management functionality.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate the embodiments and explain various principles and advantages, in accordance with the present invention.

Figure 1:
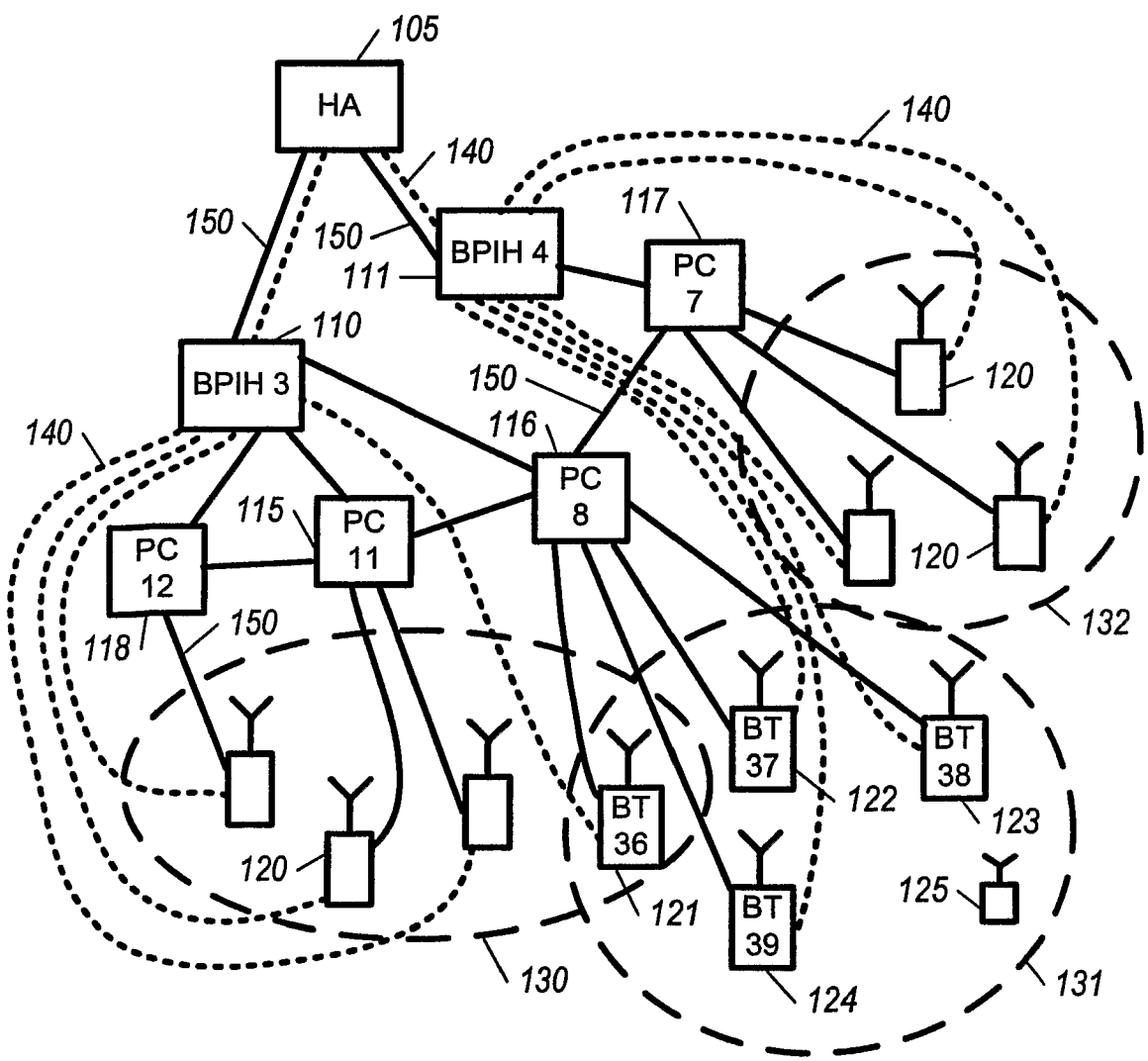
FIG. 1 is a network diagram of a wireless communication network, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to the delivery of information in a wireless communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In contrast to conventional deployments wherein the paging and location management functionality is performed by devices that also perform bearer path functions, we describe embodiments where the paging function is handled by one or more paging controller (PC) entities that are in general distinct from the bearer plane information handler (BPIH) entities that handle bearer plane functions.

Referring to FIG. 1, a network diagram of a wireless communication network is shown, in accordance with some embodiments of the present invention. The wireless communication network 100 comprises network devices that include a home agent 105, a plurality of bearer plane information handlers (BPIH's), of which two BPIH's, BPIH-3 110 and BPIH-4 111 are shown, a plurality of paging controllers (PC's), of which PC-11 115, PC-8 116, PC-7 117, and PC-12 118 are shown, a plurality of base transmitters (BT's), of which BT's 120, BT-36 121, BT-37 122, BT-38 123, and BT-39 124 are shown, and a plurality of mobile devices (MD's), of which one MD 125 is shown. Also shown are three paging areas (PA's), PA-4 130, PA-5 131, and PA-6 132. FIG. 1 also shows bearer information paths 140 as dotted lines and control information paths 150 as solid lines. These are not necessarily point-to-point communication links. The network devices other than the mobile devices may be interconnected by a variety of communication links not shown in FIG. 1. Communication links for the mobile devices 125 may consist of radio links between each mobile device and, normally, one base transmitter at any given time. Alternative linking may also be provided between the mobile device and the wireless communication network 100, such as a wireline backup link.

The mobile devices 125 may be any radio devices that serve as a client device in the wireless communication network 100, and the wireless communication network 100 may be any of a variety of networks. Some embodiments may be networks that are compatible with standards commonly designated as UMTS/HSDPA, GPRS/EDGE, IEEE 802.16, and CDMA1X/EV/DO). The term "mobile device" is a generic term derived from the fact that such devices are typically linked by radio so that they may be moved, but they may be fixed devices working in the wireless communication network 100. They may be devices normally called portable or vehicular devices.

The BPIH's in the wireless communication network 100 may be implemented, for example, as base station controllers (BSC's) when the wireless communication network 100 is a GSM network. However, the location tracking functions described in the embodiments herein are performed by the paging controllers. The paging controllers, such as paging controllers 115-118 shown in FIG. 1 may be embodied as entities that function independently from the BPIH's. The PCs may be separate physical entities, such as network elements distinct from the BPIHs, or a set of program instructions that control processors that are not also controlled by a set of BPIH program instructions, or they may be a set of program instructions that control a processor essentially independently from a set of BPIH program instructions that also control the processor (for example, as two tasks running on the processor). The PCs typically communicate with each other and the BPIH's using network messages and typically maintain separate databases, as opposed to directly manipulating databases in common with a BPIH, as could occur were they not independent sets of programs. Thus, the PCs are easily scalable and can be located independently and in larger or fewer instantiations with reference to the BPIH's.

It should be appreciated that the quantities of BPIH's, PC's, and BT's shown in FIG. 1 were selected for convenience of the illustration and accompanying descriptions, and should not be interpreted to imply typical ratios of such devices in actual wireless communication networks.

Figure 2:
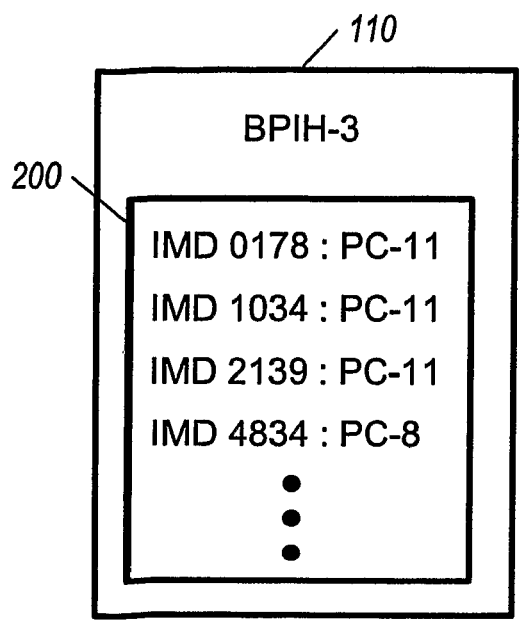
FIG. 2 is an example database relationship diagram for a database that is maintained by a bearer plane information handler in the wireless communication network, in accordance with some embodiments of the present invention.

Referring to FIG. 2, an example database relationship diagram is shown for a database 200 that is maintained by BPIH-3 110 in the wireless communication network 100, in accordance with some embodiments of the present invention. In these embodiments, each BPIH may comprise a database of paging controller associations, in which each of the paging controller associations may comprise an association of an idle mobile device to a last known paging controller of that idle mobile device. This database may herein be referred to as the last known PC database. In the example of a last known PC database 200 shown in FIG. 2, four such associations are explicitly shown, with others implied. For example, the first entry shows that an idle mobile device (IMD) with identifier 178, IMD-0178, (not shown in FIG. 1) is associated with PC-11 115. In another example, IMD-4834 125 (FIG. 1) is associated with PC-8 116 (FIG. 1). An idle mobile device may be defined as a mobile device that is not receiving or transmitting bearer plane information with the wireless communication network 100 but which is identified as being signed on the network for the purpose of communicating bearer plane information. A last known PC (LKPC) associated with an idle mobile device may be defined to be the PC that was last storing a context of the mobile; that is, information unique to the mobile device needed for communicating control messages to the mobile device.

Figure 3:
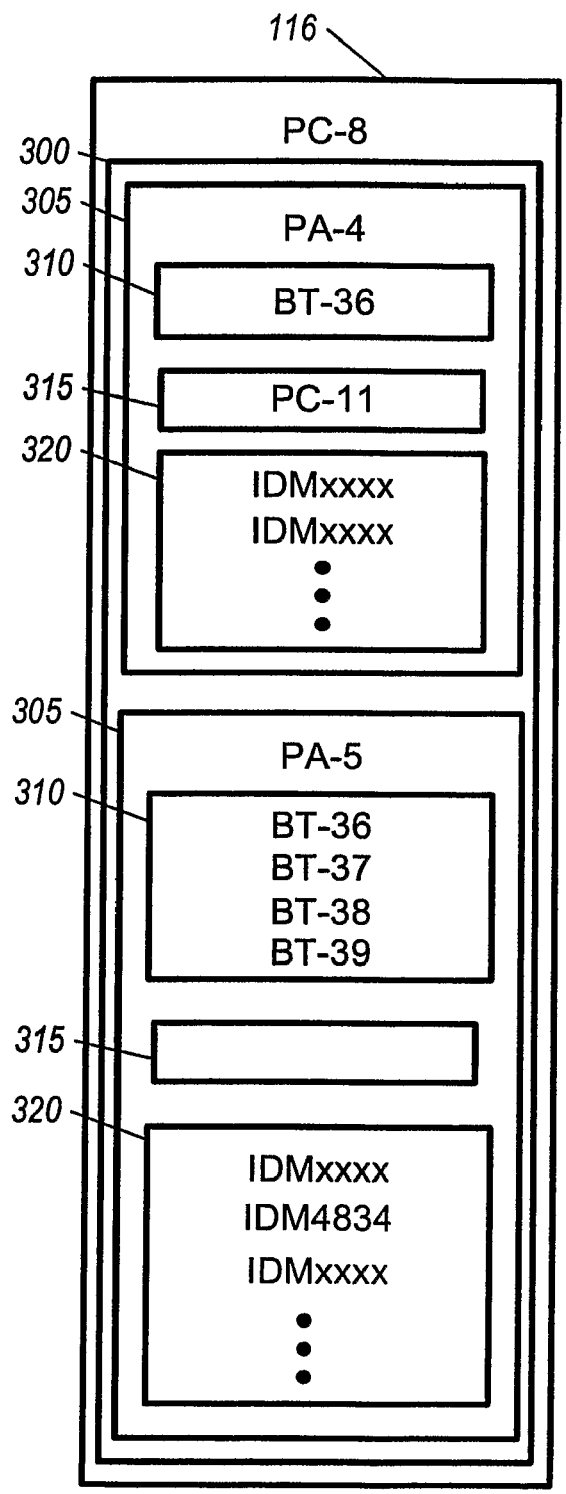
FIG. 3 is an example database relationship diagram for a database that is maintained by paging controller in the wireless communication network, in accordance with some embodiments of the present invention.

Referring to FIG. 3, an example database relationship diagram is shown for a database 300 that is maintained by PC-8 116 in the wireless communication network 100, in accordance with some embodiments of the present invention. In these embodiments, each paging controller may be associated with at least one paging area. For each paging area associated with a paging controller, the paging controller may maintain a database of all base transmitters of the paging area that are associated with the paging controller and may maintain a database of other selected paging controllers that control base transmitters in the paging area. Furthermore, for each paging area associated with a paging controller, the paging controller may maintain a database of idle mobile devices that are designated for paging control and other control purposes by the paging controller. For these idle mobile devices, the last reported location of the idle mobile device was made in that paging area. Furthermore, the paging controller may also store context information related to these idle mobile devices. The idle mobile devices in a paging area and controlled by a paging controller are not necessarily all of the idle mobile devices associated with that paging area; some may be controlled by another paging controller. Some embodiments of the present invention may include the database of all base transmitters of the paging area that are associated with the paging controller and the database of other selected paging controllers that control base transmitters in the paging area, but not the database(s) for each paging area of idle mobile devices that are controlled by the paging controller. In the example shown in FIG. 3, the database 300 in PC-8 116 includes databases 305 for paging areas PA-4 130 (FIG. 1) and PA-5 131 (FIG. 1). The database 310 for PA-4 130 (FIG. 1) includes a database 310 of all base transmitters of PA-4 130 that are associated with PC-8 116, namely BT-36 (FIG. 1), and a database 315 of other selected paging controllers that control base transmitters in the paging area. In this instance the other selectors paging controllers comprises one paging controller, PC-11 115 (FIG. 1). The term "selected" has been used, because the database 315 may not need to include all other paging controllers associated with a paging area, but may include at least one of them when there are one or more other paging controllers. Essentially, in these embodiments, the other selected paging controllers may include at least those that are needed to communicate control and paging messages to all of the paging controllers quickly and efficiently. In the example of the wireless communication network 100 (FIG. 1), PC-12 118 may be efficiently sent messages from PC-8 116 through PC-11 115, so only PC-11 115 is listed in the database 315 for PC-8 116. The database 310 for PA-4 130 further includes a database 320 of idle mobile devices in PA-4 130 that are controlled by PC-8 116. Since no idle mobile devices are identified in PA-4 of FIG. 1 explicitly, they are simply listed as idle mobile devices "IMDxxxx" with an indication (three dots) that there are more in the list.

The database 310 for PA-5 131 (FIG. 1) includes a database 310 of all base transmitters of PA-5 131 that are associated with PC-8 116, namely BT-36, BT-37, BT-38, and BT-39 121-124 (FIG. 1). The database 315 of other selected paging controllers that control base transmitters in the paging area is shown as being empty since there are none that this paging controller needs to directly contact for paging purposes. The database 310 for PA-5 131 further includes a database 320 of idle mobile devices in PA-5 131 that are controlled by PC-8 116. Since only one mobile device is identified in PA-5 131 of FIG. 1 explicitly, it is include as IMD4834 amongst other idle mobile devices identified as IMDxxxx, and with an indication that there are more idle mobile devices in the list.

Figure 4:
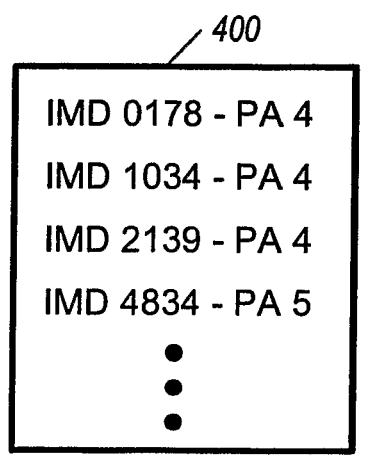
FIG. 4 is an example database relationship diagram is shown for a database of idle mobile device associations that is maintained within the wireless communication network, in accordance with some embodiments of the present invention.

Referring to FIG. 4, an example database relationship diagram is shown for a database 400 of idle mobile device associations that is maintained within the wireless communication network 100, in accordance with some embodiments of the present invention. Each of the idle mobile device associations may comprise an association of an idle mobile device to the paging area in which the idle mobile was last reported to be idle, and the database 400 may include all of the idle mobile devices in the wireless communication network 100, or in a portion of the wireless communication network 100, such as portion related to one home agent. In some embodiments, the database 400 of idle mobile device associations comprises information stored and maintained current in memory controlled by one processing unit, such as a processing unit in the home agent, or in an identified one of the PCs, or in an identified one of the BPIH's. In other embodiments, the database 400 may exist as a set of information stored and maintained in memories maintained by more than one processing unit, such as memories maintained by processing units in the BPIH's or in the PC's. When the database 400 is split amongst the PC's, it may comprise a sum of the databases 320 from all PC's within the defined portion of the wireless communication network 100. In some embodiments, the database 400 may be maintained in memories by processing units in the BPIH's or Home Agent, and the databases 320 may also be maintained in the PC's, for quick retrieval of the associations stored therein.

Figure 5:
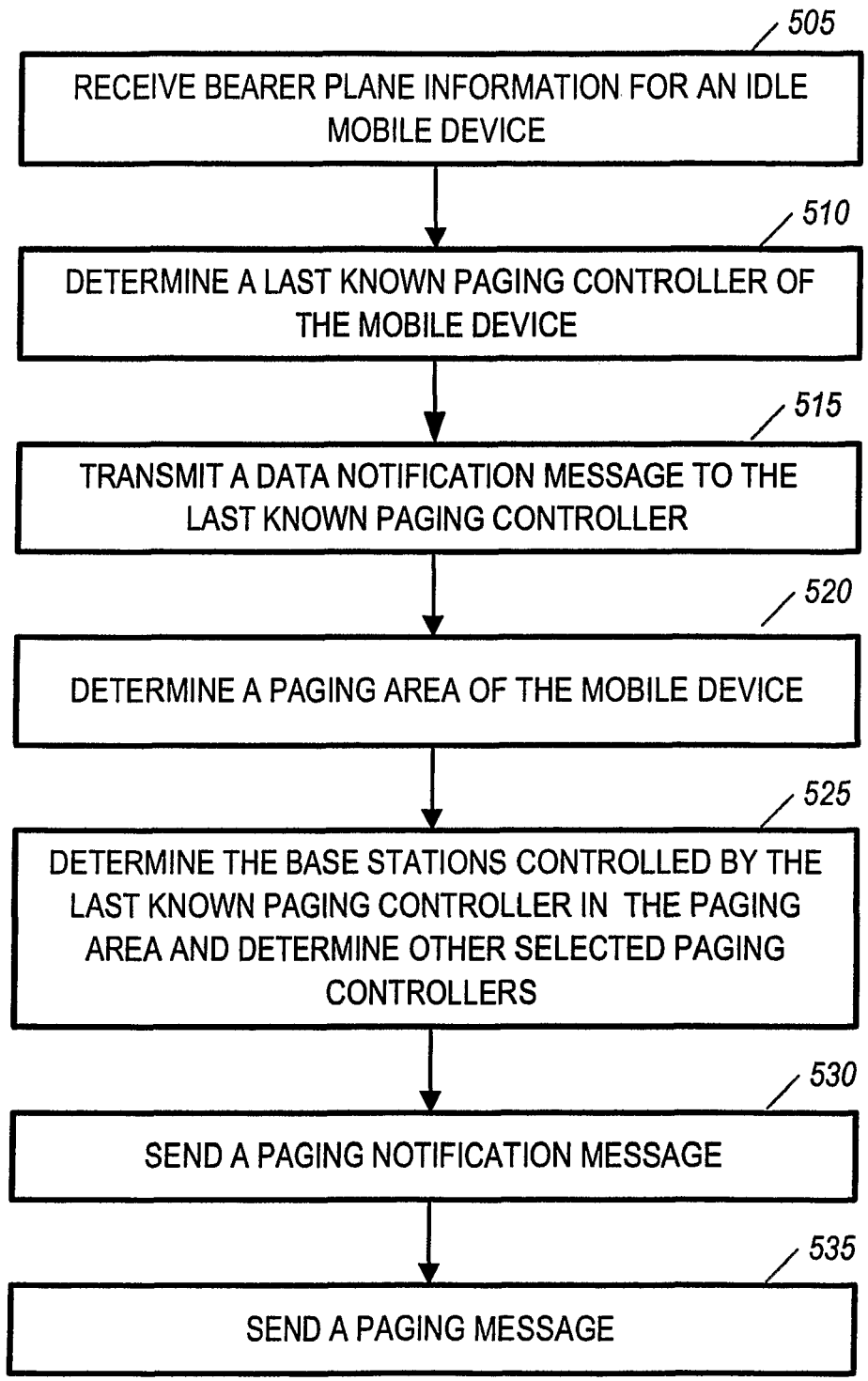
FIGS. 5 and 6 show some steps of a method used to manage information delivery in a wireless communication network, in accordance with some embodiments of the present invention.

Referring to FIG. 5, some steps of a method 500 used to manage information delivery in a wireless communication network 100 are shown, in accordance with some embodiments of the present invention. At step 505 an agent such as a BPIH 3 (FIG. 1) receives bearer plane information for a mobile device that is idle, possibly forwarded from the home agent 105 (FIG. 1). The bearer plane information may be any user related information such as cellular digitized voice, IP voice packets, text data, fixed image data, or video data, and may be sent in streaming or non-streaming form. The idle state of the mobile device may be determined by searching in the BPIH's the databases like database 200 (FIG. 2), or by a search of a database such as database 400 (FIG. 4), which, as explained above, may be located in one device (such as the home agent) or a plurality of devices (such as all the PC's associated with the agent). Other techniques could be used, such as searching a database that simply lists all idle mobile devices that is maintained within the agent.

At step 510, the last known PC associated with the idle mobile device is determined. This may be done using the last known PC databases in the BPIH's. An information notification message is then sent from the agent to the last known PC at step 515. The last known OC then determines a paging area of the mobile device at step 520 from a database such as database 320 (FIG. 3) or 400 (FIG. 4), and from the paging area the last known PC determines the base transmitters it controls from a database like the database 310 (FIG. 3), and any selected other PCs from a database like the database 315 (FIG. 3) at step 525. The last known PC then sends, at step 530, a paging notification message for the mobile device to at least one of the base transmitters and other selected paging controllers determined at step 525. The PC determines a strategy for sending the paging notification message that is similar to strategies used in current wireless communication systems for paging an idle mobile device, which may depend upon such factors as an urgency of the bearer plane information, other traffic in the same paging area, a quality of service level elected by the mobile device, which base station last received any communication from the mobile device, etc. Accordingly, the paging notification message may be transmitted by base transmitters of the paging area in a sequence, waiting for a response after each transmission, or they may be sent essentially in parallel. The paging notification message is thus sent, at step 530, to at least one of the base transmitters in the paging area, either directly by the last known PC, or indirectly through one or more of the selected PC's. At least one paging message is then transmitted to the mobile device, as indicated by step 535. The paging message is similar to those sent in conventional wireless communication networks, such as the "Paging Type 1" message used in UMTS networks and the "MOB_PAG_ADV" (mobility paging advertisement) used in IEEE802.16e compatible networks.

Figure 6:
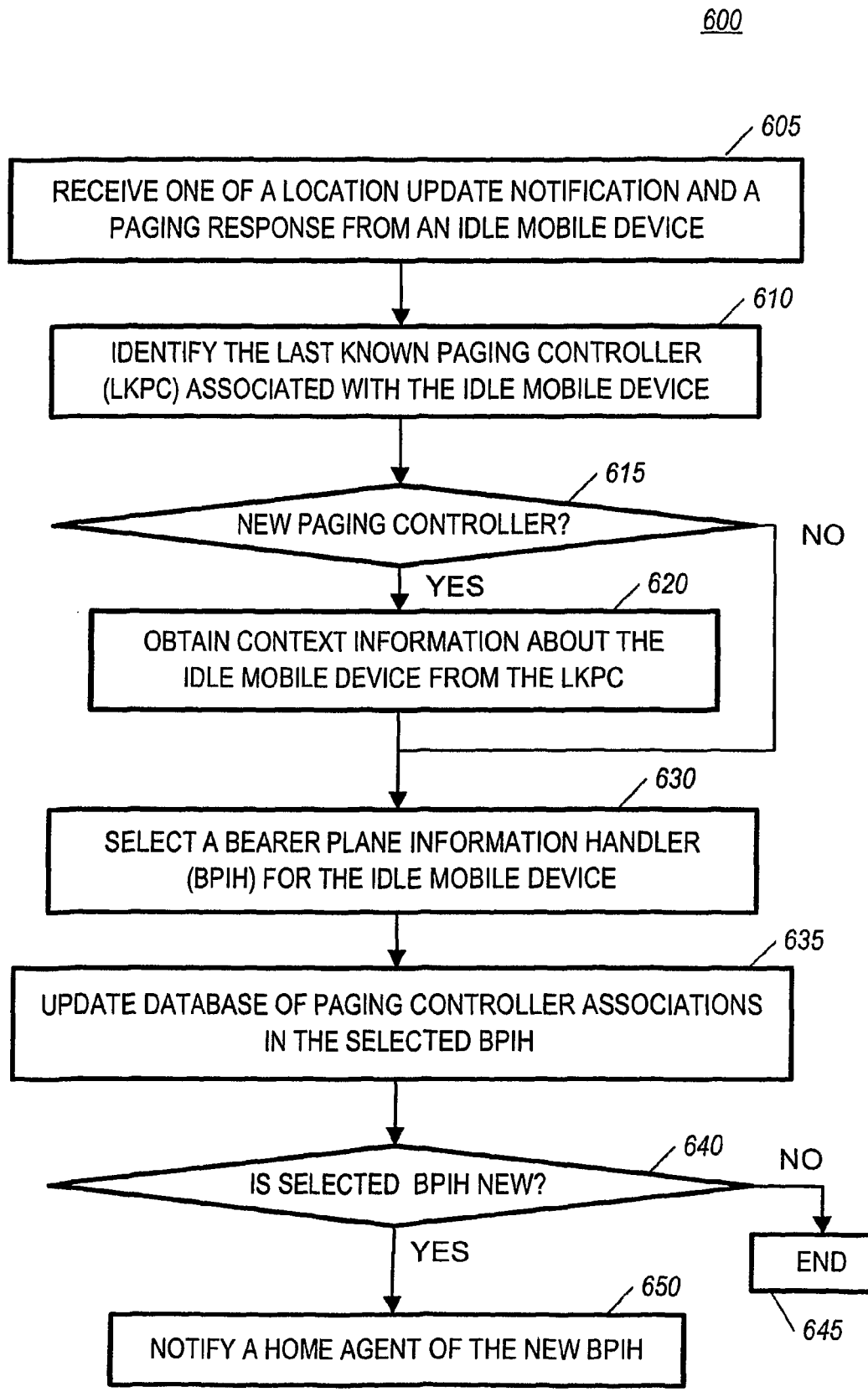

Referring to FIG. 6, some steps of a method 600 used to manage information delivery in a wireless communication network 100 are shown, in accordance with some embodiments of the present invention. At step 605, a base receiver receives an uplink control message from a mobile device that has been idle and that is one of a location update notification and a paging response. These are messages that may accomplish functions comparable to messages commonly used in current wireless communication systems. A location update notification is typically generated by a mobile device that has been idle either when the idle mobile device determines, such as by conventional means, that it is being served by a new paging area, or after a predetermined time out duration since the occurrence of a previous event such as the transmission of a successful previous location update notification or a successful paging response, and may include an identification of the last known PC for the idle mobile device. Examples of messages used in current wireless communication system that are similar to the location update notification message include the "Location Update" message of UMTS networks and the RNG_REQ "ranging request) when not sent in response to a paging request, used in IEEE 802.16e compatible networks. A paging response is typically transmitted by a mobile device that has been idle in response to receipt of a paging message such as one transmitted at step 535 (FIG. 5). Examples of messages used in current wireless communication system that are comparable to the location update notification message include either the "RC Connection Setup" message or "Service Request" messages having a paging response indication in them, of UMTS networks and the "RNG_REQ" when sent in response to a paging message, used in IEEE 802.16e compatible networks.

The base receiver that receives the uplink control message passes it to the PC that controls the base receiver (base receivers are not shown in FIG. 1, but may be co-located one to one with base transmitters or may be separate; either configuration is usable with the embodiments described herein). The PC then identifies the last known PC at step 610. There are a variety of methods that may be used to accomplish this. One is that the PC has the mobile device listed in its idle mobile database (like databases 320 shown in FIG. 3) that relate idle mobile devices to paging areas, which is to say that in these embodiments, the PC receiving the uplink control message is the last known PC. In some embodiments, the mobile device provides the previous paging area (the paging area of the last known PC) identity in the uplink control message, e.g. for the purposes of performing location update. The PC receiving the uplink control message contacts one or more other PCs in the indicated paging area (either using its own database, or contacting a "designated PC" in the specified paging area) to discover which was the last known PC.

In other embodiments, a PC may determine the last known PC by means of communications that are made with one or more BPIH's. The PC may have a BPIH that is designated as a first BPIH for the PC to contact when an uplink control message is received. The BPIH may then search the database in the last known PC database of the BPIH to determine the last known PC for the mobile device. Should the BIPH not find the mobile device in its last known PC database, a search of last known PC databases in other BPIH's is made in a predetermined manner, for example either by the PC or the first BPIH contacted by the PC.

In some embodiments, the last known PC is identified in the paging response message and the location update notification message. In some embodiments, the PC was directed by the last known PC to send a paging message and temporarily stores the last known PC for the mobile device. In some embodiments, the PC stores a table of associations between idle mobile devices and last known PC's obtained from update location messages received by the PC. Thus, the last known PC associated with the mobile device is identified at step 610. If the last known PC is determined at step 615 to be different than the PC that received the uplink control message, the PC that received the uplink control message may then obtain context information for the mobile device form the last known PC at step 620. The context information may be used by the PC to formulate other control messages to be sent to the mobile device while it remains idle, or the context information may be sent to a base transmitter for use in formulating bearer information for delivery to what has been the idle mobile device, but which now may be an active mobile device, if the uplink control message from the idle mobile device was a paging response.

If the last known PC is determined at step 615 to be the same PC that received the uplink control message, step 620 is skipped.

Whether or not the last known PC is determined at step 615 to be the same PC that received the uplink control message, a BPIH is selected to associate with the mobile device that sent the uplink control message at step 630. If the mobile device sent a location update notification, it remains as an idle mobile device. In this case, if the selected BPIH is not different from the previous BPIH, the mobile device is already in the last known PC database of the selected BPIH, but the last known PC database of the selected BPIH has to be updated at step 635 to associate the new PC with the mobile device. If the selected BPIH is different from the previous BPIH that was associated with the mobile device, the last known PC database of the selected BPIH has to be updated at step 635 to add the mobile device and the associated PC, and the last known PC database of the previous BPIH has to be updated to remove the mobile device. Alternatively, if the mobile device transmitted a paging response, the selected BPIH routes the bearer information to the base transmitter selected for transmissions to the now active mobile device, and the base transmitter uses the new context information obtained from the last known PC to transmit the bearer information. If the selected BPIH is different from the previous BPIH that was associated with the mobile device at step 640, the selected BPIH may obtain the bearer information from the previous BPIH, and the previous BPIH may remove the mobile device as an idle mobile device from its last known PC database. Furthermore, if the selected BPIH is different from the previous BPIH that was associated with the mobile device at step 640, the home agent or agents 650 associated with the selected and previous BPIH's are notified of the change of BPIH for the mobile device. If the selected BPIH is the same as the previous BPIH that was associated with the mobile device at step 640, then the method 600 is exited at step 645.

It will be appreciated that the embodiments described herein provide improved scalability of the functions that control mobile devise in wireless communication networks, thereby improving the management of the delivery of bearer information to the mobile devices in such networks.

It will be further appreciated that embodiments of the invention described herein may be comprised of one or more conventional processors and unique stored program instructions that control the one or more processors to implement, in conjunction with certain non-processor circuits, some, most, or all of the functions of the embodiments of the invention described herein. The non-processor circuits may include, but are not limited to, a radio receiver, a radio transmitter, signal drivers, clock circuits, power source circuits, and user input devices. As such, these functions may be interpreted as steps of methods to manage the delivery of bearer information in a wireless communication network. Alternatively, some or all of these functions could be implemented by a state machine that has no stored program instructions, or could be implemented in one or more application specific integrated circuits (ASIC's), in which each function or some combinations of certain of the functions are implemented as custom logic. Of course, a combination of these approaches could be used. Thus, methods and means for these functions have been described herein. In those situations for which functions of the embodiments of the invention can be implemented using a processor and stored program instructions, it will be appreciated that one means for implementing such functions is the media that stores the stored program instructions, be it magnetic storage or a signal conveying a file. Further, it is expected that one of ordinary skill, notwithstanding possibly significant effort and many design choices motivated by, for example, available time, current technology, and economic considerations, when guided by the concepts and principles disclosed herein will be readily capable of generating such stored program instructions and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A system for managing delivery of information in a wireless network, comprising:
   at least one bearer plane information handler, each bearer plane information handler maintaining a database of paging controller associations, each of the paging controller associations comprising an association of an idle mobile device to a last known paging controller of that idle mobile device;
   a first paging controller associated with a first paging area, wherein the first paging controller maintains a first database of all base transmitters of the first paging area that is associated with the first paging controller; and
   a second paging controller associated with a second paging area, wherein the second paging controller maintains a second database of all base transmitters of the second paging area that is associated with the second paging controller, wherein the second database is different than the first database.

2. The system according to claim 1, wherein the system further comprises a database of idle mobile device associations, each of the idle mobile device associations comprising an association of an idle mobile device to a paging area in which the idle mobile device was last reported to be idle.

3. The system according to claim 1, wherein the first and second paging controllers further comprises at least one database of idle mobile devices, each of the at least one database of idle mobile devices comprising an association of idle mobile devices to a paging area wherein the idle mobile devices are designated for paging control by the first or second paging controller.

4. The system according to claim 1 wherein the first paging controller further maintains a database of other paging controllers that control base transmitters in the first paging area.

5. The system according to claim 1 wherein the second paging controller further maintains a database of other paging controllers that control base transmitters in the second paging area.

* * * * *